3,085,971
HYDROGENATION PROCESS EMPLOYING
HYDROGEN HALIDE CONTAMINATED
HYDROGEN
John Mooi, Homewood, Owen H. Thomas, Chicago, and Emmett H. Burk, Jr., Hazelcrest, Ill., assignors, by mesne assignments, to Sinclair Research, Inc., New York, N.Y., a corporation of Delaware
No Drawing. Filed May 7, 1959, Ser. No. 811,550
7 Claims. (Cl. 208—89)

This invention relates to a process for hydrogenating feed materials containing unsaturates, e.g. olefins and aromatics, which can be employed in hydrocarbon conversion processes where a hydrogen halide-containing hydrogen stream is employed.

Refiners or other operators are interested in procedures for utilizing a hydrogen stream contaminated with hydrogen halide in one instance, and in another instance, for procedures for removing aromatic and olefinic contaminants in hydrocarbon feeds employed in hydrocarbon conversion processes. It has been found that the presence of small amounts of various poisons in the hydrocarbon e.g. paraffin, feed used in the hydrocarbon conversion processes adversely affect, for instance, a noble metal-aluminum halide-alumina catalyst, described in the copending application of Keith and Burk, Serial No. 683,931 employed in the conversion of, for example, the n-paraffinic hydrocarbon materials in the feed. In most cases the poison probably functions by complexing with the Friedel-Crafts catalyst; however, at low temperatures the noble type metal of the platinum group may be poisoned by small amounts of such as sulfur-containing compounds for example $H_2S$, mercaptans, thiophenes, and sulfides. The poisons most likely present in the feed are hydrogen sulfide; aromatics, e.g. benzene, and alkyl benzenes, e.g. toluene; oxygen-containing inorganic compounds, e.g. water; alcohols, e.g. ethanol; ethers, e.g. diethyl ether; nitrogen-containing compounds, e.g. amines, $NH_3$, pyridine; amino alcohols, e.g. ethanolamine; and possibly arsenic, lead, and phosphorous compounds. The hydrocarbon feeds employed in processes using a catalyst of this type have been hydrogenated to alleviate the effects of these poisons on the catalyst.

In a hydrogenation process described in the copending application of Keith, Burk, and Michaels, Serial No. 712,312, filed January 31, 1958, now abandoned, the hydrogenation is effected in the presence of a noble metal-activated alumina catalyst. This catalyst generally contains about 0.01 to 2 weight percent, preferably 0.1 to 0.75 weight percent, of one or more of the platinum metals of group VIII, e.g. platinum, palladium, rhodium, ruthenium, or iridium, as well as a base of an activated or gamma alumina such as those derived by calcination of amorphous alumina, alumina monohydrate, alumina trihydrate or their mixtures.

However, the use of a noble metal e.g. platinum-alumina, catalyst in a reactor in series with noble metal-aluminum halide-alumina-hydrogen halide hydrocarbon conversion e.g. isomerization, units would be of considerable capital advantage if a common gas, e.g. hydrogen, recycle system could be utilized. This would require that the platinum-alumina catalyst maintain its hydrogenation activity in the presence of low hydrogen chloride partial pressures. Present findings, however, show that HCl interacts with the platinum-alumina resulting in a rapid loss in platinum-alumina catalyst area and crush strength.

In accordance with the process of the present invention, the catalytic poisoning effects of the unsaturates such as aromatics in a paraffinic hydrocarbon feed material are advantageously reduced by catalytically hydrogenating the unsaturates in the feed material with a noble metal-boria-alumina catalyst which is stable in the presence of hydrogen halide of atomic weight between 35 and 85 and which would allow the use of a hydrogen recycle gas containing hydrogen halide. Thus, the advantages of the noble metal-boria-alumina catalyst in the process of the present invention revolve about its use as a hydrogenation catalyst in the presence of hydrogen halide, i.e. hydrogen chloride, hydrogen bromide and their mixtures. Any feed pretreatment stage involving hydrogenation for a process utilizing $H_2$-hydrogen halide can be accomplished with a common recycle system. This catalyst will avoid the need for a hydrogen halide stripper before the hydrogenation reactor and a means for reblending hydrogen halide back to the recycle stream after the hydrogenation reactor if it is going to be used further.

The paraffinic feed material employed in our hydrogenation process is derived from crude petroleum hydrocarbons, as by distillation, reforming and extraction processes, and is usually desulfurized using a conventional hydrodesulfurization catalyst, e.g. a cobalt-molybdenum catalyst, under hydrodesulfurization conditions, e.g. about 650 to 750° F. and 1000 p.s.i.g. The feed is generally a desulfurized $C_4$ to $C_{12}$ paraffinic-containing hydrocarbon cut of a, e.g. straight run distillate, but often in the case of isomerization feeds, is a $C_4$ to $C_9$ n-paraffinic-containing desulfurized cut, while in the case of cracking feeds it is often a hydrocarbon material containing a predominant amount of $C_8$ to $C_{12}$ paraffinic materials and in the case of alkylation feeds it is often a hydrocarbon material containing $C_4$ to $C_{10}$ paraffinic materials. These feeds generally have a sulfur content of about .01 to .001 weight percent but usually .005 to .002, an aromatic content generally is about 1 to 15 but usually about 2 to 5 weight percent, an oxygen content generally from about .005 to .0005 but usually about .001 weight percent and small amounts of nitrogen, usually about 0.002 weight percent. The olefinic, e.g. olefins, diolefins and polyolefins, content of the feeds can vary over a large range. For instance the olefinic content in many of the $C_4$ to $C_9$ n-paraffinic containing feeds destined for isomerization processes may be practically nil whereas in other hydrocarbon feeds it can be up to about 20 or 50 weight percent. The product of our process may be dried and final traces of sulfur removed according to conventional procedures, for example in a silica gel of bauxite tower.

The time required for catalytic hydrogenation of the feed material in this hydrogenation process is dependent upon the concentration of catalytic poisons in the feed. Hydrogentation of the feed is continued for a time sufficient to substantially remove the poisonous effect of the feed on the catalyst to be used subsequently, for instance, such that the effect of the feed on catalyst activity will be negligible for at least 9 hours but preferably for at least about 125 hours processing time. Generally the hydrogentation of the feed material is continued until the olefinic content in the feed is reduced to less than about 0.01 weight percent and preferably to less than about 0.002 weight percent, the oxygen-containing compound content in the feed is reduced to less than about 0.005 weight percent and preferably to less than about 0.0005 weight percent, the aromatic content is reduced to less than about 0.01 weight percent and preferably less than about 0.002 weight percent, the nitrogen containing compound content is reduced to less than about 0.001 weight percent and preferably less than about 0.0002 weight percent and the sulfur content is less than about 0.006 weight percent and preferably less than about 0.003 weight percent. When hydrogentating a $C_4$ to $C_9$ n-paraffin containing hydrocarbon feed, some isomerization may occur, particularly when temperatures above about 500° F. are employed.

The hydrogenation process of the present invention can be conducted using preferably a noble platinum group metal-boria-activated alumina catalyst at temperatures generally from about 200° F. to 750° F., and preferably from about 500° F. to 650° F. Other conditions frequently employed in our process are elevated pressures generally from about 400 to 1500 p.s.i.g., and preferably from about 500 to 750 p.s.i.g.; a hydrogen to hydrocarbon mol ratio generally of from about one to 20:1, and preferably of from about 3 to 10:1 and a WHSV generally of from about .5 to 20:1 and preferably from about 0.5 to 10:1.

The catalyst employed in the process of the present invention includes catalytically effective amounts of a noble or platinum group metal and boria supported on an alumina base. The catalyst generally contains about 0.01 to 2 weight percent, preferably 0.1 to 1 weight percent, of one or more of the platinum metals of group VIII, that is platinum, palladium, rhodium, ruthenium, osmium or iridium. The small amount of noble metal may be present in the metallic form or as a sulfide, oxide or other combined form. The metal may interact with other constituents of the catalyst, but if during use the noble metal be present in metallic form, then it is preferred that it be so finely divided that it is not detectable by X-ray diffraction means, i.e. that it exists as crystals of less than 50 Angstrom units size. Of the noble metals, platinum is preferred.

The boria component is surface dispersible on the support and seems essentially inert to hydrogen halide. It is employed in amounts sufficient to enhance the life of the alumina support and such amounts are therefore, preferably added in direct proportion to the area of the support. For instance, the amount of boria will usually be about 3 to 20 weight percent, and preferably about 8 to 15 weight percent of the catalyst. These amounts are particularly effective on alumina having surface areas of about 350 to 550 square meters per gram (BET) before use.

The noble metal and boria constituents of the catalyst are deposited on an absorptive alumina base of the activated or calcined type. The base is usually the major component of the catalyst, generally constituting about 75 to 97 weight percent, preferably at least about 80 to 90 percent on the basis of the catalyst. The catalyst base is an activated or gamma alumina such as those derived by calcination of amorphous hydrous alumina, alumina monohydrate, alumina trihydrate or their mixtures. The catalyst base precursor most advantageously is a mixture predominating in or comprising a major portion of, for instance, about 65 to 95 weight percent, one or more of the alumina trihydrates bayerite I, bayerite II (randomite) or gribbsite, and about 5 to 35 weight percent of alumina monohydrate (boehmite), amorphous hydrous alumina or their mixture. The alumina base can contain small amounts of other solid oxides such as silica, magnesia, natural or activated clays (such as kaolinite, montmorillonite, halloysite, etc.), titania, zirconia, etc., or their mixtures. Although the components of the catalyst can vary as stated, the preferred catalyst contains platinum and boria deposited on activated alumina.

Free or molecular hydrogen must be present in our reaction system and the hydrogen to n-paraffin molar ratio will usually be from about 1 to 20:1 or more, preferably about 5 to 10:1. The hydrogen concentration can be maintained by recycling hydrogen rich gases which can contain a hydrogen halide of atomic weight between 35 and 85 e.g. HCl, HBr and their mixtures, during the processing period in an amount generally from about 1 up to about 25 weight percent, based on the hydrocarbon feed, and usually from about 1 up to about 20% or from about 5 to 15 weight percent, of the hydrogen halide.

Instead of the hydrogen containing hydrogen halide with an atomic weight between 35 and 85 as such, an organohalogen compound or other substance which will produce the hydrogen halide under the reaction conditions can be employed. Suitable hydrogen halide precursors of this type include the elemental halogens, chlorine and bromine; mono- and polyhalo-alkanes such as carbon tetrachloride, chloroform and tertiary butyl chloride; or other available materials which will be converted under the conditions of reaction to provide the above-mentioned amount of hydrogen halide.

As previously stated the preferred catalyst base material is an activated or gamma-alumina made by calcining a precursor predominating in, or containing a major proportion of, alumina trihydrate. An alumina of this type is disclosed in U.S. Patent No. 2,838,444. The alumina base is derived from a precursor alumina hydrate composition containing about 65 to 95 weight percent of one or more of the alumina trihydrate forms gibbsite, bayerite I and bayerite II (randomite) as defined by X-ray diffraction analysis. The substantial balance of the hydrate is amorphous hydrous or monohydrate alumina. Trihydrates are present as well-defined crystallites, that is they are crystalline in form when examined by X-ray diffraction means. The crystallite size of the precursor alumina trihydrate is relatively large and usually is in the 100 to 1000 Angstrom unit range. The calcined alumina has a large portion of its pore volume in the pore size range of about 100 to 1000 Angstrom units generally having about 0.1 to about 0.5 and preferably about 0.15 to about 0.3 cc./g. of pore volume in this range. As described in these applications the calcined catalyst base can be characterized by large surface area ranging from about 350 to about 550 or more square meters/gram when in the virgin state as determined, for example, by the BET adsorption technique. A low area catalyst base prepared by treating the predominantly trihydrate base precursor is described in U. S. Patent No. 2,838,445. This base when in the virgin state has substantially no pores of radius less than 10 Angstrom units and the surface area of the catalyst base is less than 350 square meters/gram and most advantageously is in the range of about 150 to 300 square meters/gram.

The platinum metal component of the catalyst can be added to the alumina base by known procedures. For instance, the platinum metal component can be deposited on a calcined or activated alumina, but it is preferred to add the platinum metal component to the alumina hydrate base precursor. Thus platinum can be added through reaction of a halogen platinum acid, for instance, fluoro-, chloro-, bromo- or iodo-platinic acid, and hydrogen sulfide in an aqueous slurry of the alumina hydrate. The hydrogen sulfide can be employed as a gas or an aqueous solution. Alternatively, the platinum component can be provided by mixing an aqueous platinum sulfide sol with the alumina hydrate. This sol can be made by reaction in an aqueous medium of a halogen platinic acid with hydrogen sulfide. The alumina hydrate containing the platinum metal can be dried and calcined usually at a temperature from about 750 to 1200° F. or more to provide the activated or gamma alumina modifications. The boria component can be added to the catalyst in any stage of its preparation. It may be incorporated in the support, either before or after the addition of the group VIII metal, by impregnation from a hot, heated or boiling solution of water. It is frequently added to the catalyst after it has been formed by tableting or extrusion and calcined. After the boria is added according to this procedure, the catalyst can be recalcined.

Although the noble metal-boria-alumina catalyst can be activated during hydrogenation processing on stream, it can be pre-reduced or pre-activated. Pre-activation can be accomplished by treatment with hydrogen at an elevated temperature, for instance about 800 to 1000° F. Rather than pre-activate the catalyst it can be used directly in the hydrogenation process and the presence of the free hydrogen gas will cause activation in the initial stages of the process.

The catalyst employed in the process of the present invention can be easily regenerated employing conventional procedures, for instance by subjecting it to an oxygen-containing gas at temperatures sufficient to burn off carbon deposited on the catalyst during the conversion of petroleum hydrocarbon feedstock. This oxygen-containing gas, e.g., an oxygen-nitrogen mixture, can contain about 0.01 weight percent to 5 weight percent oxygen but preferably contains about 0.5 to 1.5 weight percent oxygen and is introduced at a flow rate such that the maximum temperature at the site of combustion is below about 1000° F.

The hydrogenated products of the present invention can be used with noble metal-aluminum halide-alumina catalysts which have particular utility in the hydrocarbon conversion field, e.g. cracking, isomerization, and alkylation processes, and especially in a process described in the above copending application directed to the isomerization of $C_4$ to $C_9$ n-paraffinic-containing hydrocarbon materials at relatively low temperatures while obtaining satisfactory conversion to isomeric structures. This isomerization process includes contacting the $C_4$ to $C_9$ n-paraffin in the vapor phase with the noble metal-aluminum halide Friedel-Crafts-alumina catalyst at a temperature of about 150 to 450° F., in the presence of free hydrogen, and while providing about 0.05 to 35 percent of a hydrogen halide based on the n-paraffin. In another isomerization process, described in the copending application of Keith and Burk Serial No. 712,329, filed January 31, 1958, now abandoned, a $C_4$ to $C_9$ n-paraffinic-containing hydrocarbon material in liquid phase is contacted with the noble metal-aluminum halide-alumina catalyst in the presence of free hydrogen and hydrogen halide at a temperature from about 200° F. to 450° F. and a pressure from about 100 to 900 p.s.i.g. The free hydrogen can be present in a hydrogen to hydrocarbon molar ratio of about 0.01 to 15:1 and about 0.05 to 35 percent, based upon the n-paraffin, of hydrogen halide may be provided.

In a cracking process employing a hydrogenated product produced by our process, described in the copending application of Thomas and Keith, Serial No. 712,304, filed January 31, 1958, now Patent No. 2,964,462, a hydrocarbon material containing a predominant amount of $C_8$ to $C_{12}$ paraffinic materials is contacted with a noble metal-aluminum halide-alumina catalyst in a reaction zone under cracking conditions including the presence of free hydrogen and hydrogen halide in the reaction zone, and a temperature from about 200° F. to 450° F. Other conditions which can be employed in this process are pressures from about 100 to 1000 p.s.i.g., a hydrogen to hydrocarbon molar ratio of about 5 to 50:1, and a hydrogen halide to hydrocarbon mole ratio of from about 0.1 to 10:1.

In an alkylation process employing a hydrogenated product produced by our process, described in the copending application of Thomas and Michaels, Serial No. 712,305, filed January 31, 1958, now Patent No. 2,972,649, paraffinic hydrocarbon materials including the normal or isoalkanes in the $C_4$ to $C_{10}$ range, are alkylated with olefinic hydrocarbon materials in the vapor phase using a noble metal-aluminum halide-alumina catalyst at a temperature from about 150 to 450° F. in the presence of hydrogen. Other conditions include a pressure from about 100 to 1000 p.s.i.g., about 0.1 to 10:1 weights of olefinic hydrocarbon per hour per weight of catalyst, a molar ratio of paraffinic to olefinic hydrocarbons of about 2 to 20:1, a hydrogen to olefinic hydrocarbon molar ratio of about 0.01 to 0.25, and in the presence of hydrogen halide at a concentration of about 0.5 to 35 weight percent of the hydrocarbon feed.

As described in the above copending application of Keith and Burk, Serial No. 633,931, filed September 16, 1957, now Patent No. 2,971,358, hereby incorporated by reference, the hydrocarbon conversion catalyst includes catalytically effective amounts for instance, about 0.01 to 2 weight percent, of a noble metal, about 2 to 50 weight percent of an aluminum halide Friedel-Crafts component and, at least ultimately in the reaction system, about 0.5 to 15 percent or more of a hydrogen halide, all of which are supported on an alumina base. The base is usually the major component of the catalyst, constituting about 40 to 95 weight percent, preferably at least about 50 percent. The catalyst base is an activated or gamma-alumina such as those derived by calcination of amorphous hydrous alumina, alumina monohydrate, alumina trihydrate or their mixtures. The catalyst base precursor most advantageously is a mixture predominating, for instance about 65 to 95 weight percent, in one or more of the alumina trihydrates bayerite I, bayerite II (randomite) or gibbsite, and about 5 to 35 weight percent of alumina monohydrate (boehmite), amorphous hydrous alumina or their mixture. The alumina base can contain small amounts of other solid oxides such as silica, magnesia, boria, natural or activated clays (such as kaolinite, montmorillonite, halloysite, etc.), titania, zirconia, etc., or their mixtures.

The invention will be more clearly illustrated in the following examples, but they are not to be considered as limiting.

EXAMPLE I (A) *Preparation of Noble Metal-Alumina Composition*

A noble metal-alumina composition of the kind described in U.S. Patent No. 2,838,444 can be employed in preparing the catalyst used in the process of our invention. The composition of this application can be made as follows. Pure aluminum metal is dissolved in pure hydrochloric acid, and the resulting solution is mixed with deionized water to form an aqueous aluminum chloride solution and an alumina gel is prepared equivalent to approximately 65 grams of $Al_2O_3$ per liter. A separate deionized water solution of $NH_4OH$ is prepared containing approximately 65 grams of ammonia per liter. These two reagents in approximate volume ratio of 1:1 are intimately mixed as a flowing stream at a pH of 8.0. The flowing stream is passed to a stoneware container and an alumina hydrate is visible. The precipitated hydrate is filtered from the mother liquid and washed to <0.2% chloride by successive filtrations and reslurryings in deionized water until the desired chloride concentration is reached. In each reslurrying ammonia is added to give a pH of about 9. The washed hydrate is covered with water in a container and aged at about 90° F. until it is approximately 70% trihydrate, the remaining being substantially of the amorphous or monohydrate forms. The total hydrate composition is comprised of 42% bayerite, 18% randonite, 11% gibbsite, 20% boehmite, and 9% amorphous as determined by X-ray diffraction analysis. The aged hydrate is mixed with deionized water in a rubber lined container to provide a slurry of about 7 weight percent $Al_2O_3$ at a pH of about 8.0. A chloroplatinic acid solution in deionized water (0.102 gram platinum per milliliter) is stirred into the slurry and the slurry is then contacted with a deionized water solution which has been saturated with $H_2S$ at 78° F. to precipitate the platinum. The pH of the slurry is adjusted to 6.0 to 6.5 by ammonium hydroxide addition and the solids of the slurry are dried on a horizontal drum drier to give a powder of generally less than 20 mesh. The drum dried powder is mixed in a planetary type dough beater with sufficient deionized water to indicate 26 weight percent water on a Central Scientific Company Infra-red Moisture Meter containing a 125 watt bulb, Cat. No. 26675. The resulting mixture is forced through a die plate having holes $1/16''$ in diameter bolted to a $3\frac{1}{2}''$ Welding Engineers screw extruder. The resulting strands are broken to particles of length varying generally between about 1/16" to 1".

The particles are dried at 230° F. and calcined by heating to 925° F. in a flow of nitrogen gas followed by a flow of air while the composition is maintained at a temperature in the range of 865° to 920° F. The composition thus produced analyzes about 0.6 weight percent of platinum which is in sufficiently divided form so as to exhibit by X-ray diffraction studies the substantial absence of crystallites or crystals of size larger than 50 Angstrom units. After the calcination the composition has an area (BET method) within the range from about 350 to 550 square meters/gram.

*(B) Preparation of Noble Metal-Boria-Alumina Catalyst*

A platinum-alumina composition prepared essentially as described above, except that air was used for the complete calcination procedure and containing about 0.6% platinum was employed in preparing the noble metal-boria-alumina catalyst by the following procedure. 300 grams of the platinum-alumina composition were weighed into a 6" crystallizing dish. 59 grams of $H_3BO_3$ were dissolved in 279 ml. of deionized water by heating to boiling. The hot boric acid solution was poured over the catalyst and stirred thoroughly with a rubber spatula. The catalyst was placed in a forced air drying oven, set at 140° C., for 4 hours. The catalyst was stirred occasionally while drying. The oven dried catalyst was transferred to a sagger and placed in a muffle furnace preheated to 1000° F. The catalyst was held at 1000° F. for 2 hours and cooled in a desiccator. Analysis: 9.95% $B_2O_3$. Sample No. 500–7093.

*(C) Activation of Noble Metal-Boria-Alumina Catalyst*

40 grams of this catalyst were supported on glass beads in the center of a 1-inch I.D. Universal Stainless Steel Reactor. The reactor was set in place in a bronze-block furnace controlled by "Microswitch" thermostats. The catalyst was heated to 800° F. under atmospheric pressure of pure hydrogen flowing at about 2 cu. ft./hr. These conditions were maintained for 16 hours. At this time the reactor is cooled to operating temperatures and reaction conditions are established for processing the paraffin feed.

*(D) Hydrogenation Process Employing a Noble Metal-Boria-Alumina Catalyst*

A typical straight run naphtha cut containing approximately 35% n-$C_5$ paraffins and 65% n-$C_6$ paraffins is contaminated with 4% aromatics which must be removed prior to isomerization with noble metal-aluminum halide-alumina-hydrogen halide. This desulfurized feed is fed to the hydrogenation reactor containing the platinum-boria-alumina catalyst. The catalyst bed is held at 600° F., 600 p.s.i.g., with a ($H_2$/H'C) mole ratio of 5 and a WHSV of 1. The HCl content of the recycle gas is approximately 5 weight percent based on hydrocarbon feed. The product contains aromatics in the 0.001 weight percent range. This is then fed directly into the noble metal-aluminum halide-alumina-hydrogen halide isomerizer for further reaction to produce i-$C_5$ and i-$C_6$ high octane components.

STABILITY CHARACTERISTICS

The superior stability characteristics, expected in the presence of the hydrogen chloride component in the hydrogenation process of the present invention, of a platinum-boria-alumina composition prepared essentially according to the procedure as described in Example I(B) above is shown below in comparison with a platinum-alumina composition without the boria and prepared essentially as described in Example I(A) above.

A 5.46 gram portion of commercial Sinclair-Baker RD–150 catalyst (a platinum-alumina catalyst prepared essentially according to the procedure described in Example I(A) above) was placed in a Pyrex tube. The catalyst was supported on a sintered glass disc to allow gas to pass up through it. A thermocouple well was led from the side of the tube into the catalyst bed. Anhydrous hydrogen chloride gas was passed through the catalyst at a rate of about 25 cc./min. at atmospheric pressure. A furnace was placed around the tube, heat was turned on and the temperature inside the thermowell brought to 600° F. The temperature was maintained at 600± 10° F. for 188 hours. The catalyst was purged of HCl with flowing $H_2$ for two hours, cooled and removed from the tube.

A 7.00 gram portion of Sinclair-Baker RD–150 catalyst + 10% $B_2O_3$ was charged to a similar apparatus and treated in an identical manner as Sinclair-Baker the RD–150 catalyst described in the previous paragraph. The surface area of each catalyst was determined before and after this treatment. The measurement was made by the BET method using $N_2$ adsorption at the temperature of liquid nitrogen. The Sinclair-Baker RD–150 catalyst area fell from 500 to 180 square meters/gram while the Sinclair-Baker RD–150–$B_2O_3$ catalyst area fell from 380 to 280 square meters/gram. The results indicate that $B_2O_3$ has a stabilizing effect on the alumina structure.

It is claimed:
1. A process for hydrogenating a $C_4$ to $C_{12}$ paraffinic hydrocarbon feed material contaminated with catalyst poisons, the effect of which can be alleviated by hydrogenation, and hydrogen halide for use in a hydrocarbon conversion process, the step comprising hydrogenating the hydrocarbon feed material under hydrogenating conditions including temperatures from about 200° F. to 750° F., and elevated pressures in the presence of free hydrogen containing a hydrogen halide of atomic weight between 35 and 85 in an amount up to about 25 weight percent based upon the hydrocarbon feed, and in the presence of a hydrogenating catalyst consisting essentially of about 0.01 to 2 percent of a noble metal and about 3 to 20 percent of boria supported on an activated alumina base.

2. The process of claim 1 wherein the feed material is a desulfurized straight run gasoline; the hydrogenating conditions include temperatures from about 500° F. to 650° F., pressures from about 500 to 750 p.s.i.g., and a hydrogen to hydrocarbon mol ratio of about 1 to 20:1 and the hydrogenating catalyst consists essentially of about 0.1 to 0.75 percent of platinum and about 8 to 15 percent of boria supported on an activated alumina base, said base derived by calcination of an alumina hydrate precursor consisting essentially of about 65 to 95 percent of alumina trihydrate and about 5 to 35 percent of a member selected from the group consisting of amorphous hydrous alumina and alumina monohydrate and their mixture; and the calcined alumina has an area of about 350 to 550 square meters per gram.

3. A process for hydrogenating a $C_4$ to $C_{12}$ paraffinic hydrocarbon feed material contaminated with hydrogen halide and unsaturate catalyst poisons for use in a hydrocarbon conversion process employing a hydrocarbon conversion catalyst consisting essentially of about 0.01 to 2 percent of a platinum group noble metal, about 2 to 50 percent of an aluminum halide Friedel-Crafts component selected from the group consisting of aluminum chloride and aluminum bromide, about 0.5 to 15 percent of a hydrogen halide and about 40 to 95 percent of an activated alumina, the step comprising hydrogenating the hydrocarbon feed material under hydrogenating conditions including temperatures from about 200° F. to 750° F., at elevated pressures in the presence of a hydrogenating catalyst consisting essentially of about 0.01 to 2 percent of a platinum group noble metal and about 3 to 20% of boria supported on an activated alumina base and employing the hydrogenated feed material in said hydrocarbon conversion process employing said hydrocarbon conversion catalyst.

4. The process of claim 3 wherein the feed material is a desulfurized straight run gasoline; the hydrogenating conditions include temperatures from about 500° F. to 650° F., pressures from about 400 to 1500 p.s.i.g., and a hydrogen to hydrocarbon mol ratio of about 1 to 20:1; and the hydrogenating catalyst consists essentially of about 0.1 to 1 percent of platinum and about 8 to 15% of boria supported on an activated alumina base, said base derived by calcination of an alumina hydrate precursor consisting essentially of about 65 to 95 percent of alumina trihydrate and about 5 to 35 percent of a member selected from the group consisting of amorphous hydrous alumina and alumina monohydrate and their mixture; and the calcined alumina has an area of about 350 to 550 square meters per gram.

5. The process of claim 4 wherein the hydrocarbon feed material is a desulfurized $C_4$ to $C_9$ n-paraffinic-containing hydrocarbon material; the hydrocarbon conversion process is an isomerization process employing isomerization conditions including contacting said n-paraffin in the vapor phase with said hydrocarbon conversion catalyst at a temperature of from about 150 to 450° F., in the presence of free hydrogen and while providing about 0.05 to 35 percent of a hydrogen halide based on the n-paraffin.

6. The process of claim 5 wherein the activated alumina in the hydrocarbon conversion catalyst is derived by calcination of an alumina hydrate precursor consisting essentially of about 65 to 95 percent of alumina trihydrate and about 5 to 35 percent of a member selected from the group consisting of amorphous hydrous alumina and alumina monohydrate and their mixture; and a calcined alumina has an area of about 350 to 550 square meters/gram.

7. The process of claim 6 wherein the activated alumina in the hydrogenating catalyst is derived by calcination of an alumina hydrate precursor consisting essentially of about 65 to 95 percent of alumina trihydrate and about 5 to 35 percent of a member selected from the group consisting of amorphous hydrous alumina and alumina monohydrate and their mixture; and a calcined alumina has an area of about 350 to 550 square meters/gram.

References Cited in the file of this patent

UNITED STATES PATENTS

| | | |
|---|---|---|
| 2,493,499 | Perry | Jan. 3, 1950 |
| 2,642,384 | Cox | June 16, 1953 |
| 2,793,984 | Northcott et al. | May 28, 1957 |
| 2,838,444 | Teter et al. | June 10, 1958 |
| 2,876,268 | Ciapetta et al. | Mar. 3, 1959 |
| 2,905,663 | Schmerling | Sept. 22, 1959 |
| 2,914,461 | Ciapetta | Nov. 24, 1959 |
| 2,966,529 | Haensel et al. | Dec. 27, 1960 |